(No Model.)

J. T. CRIST.
HORSE RAKE.

No. 356,351. Patented Jan. 18, 1887.

WITNESSES
F. L. Ourand
Edward Stanton

John T. Crist,
INVENTOR
By Louis Bagger & Co.
Attorneys

UNITED STATES PATENT OFFICE.

JOHN T. CRIST, OF JERSEY SHORE, PENNSYLVANIA.

HORSE-RAKE.

SPECIFICATION forming part of Letters Patent No. 356,351, dated January 18, 1887.

Application filed April 30, 1886. Serial No. 200,696. (No model.)

*To all whom it may concern:*

Be it known that I, JOHN T. CRIST, of Jersey Shore, in the county of Lycoming and State of Pennsylvania, have invented certain new and useful Improvements in Horse-Rakes; and I do hereby declare that the following is a full, clear, and exact description of the invention, which will enable others skilled in the art to which it appertains to make and use the same, reference being had to the accompanying drawings, which form a part of this specification, and in which—

Figure 1:
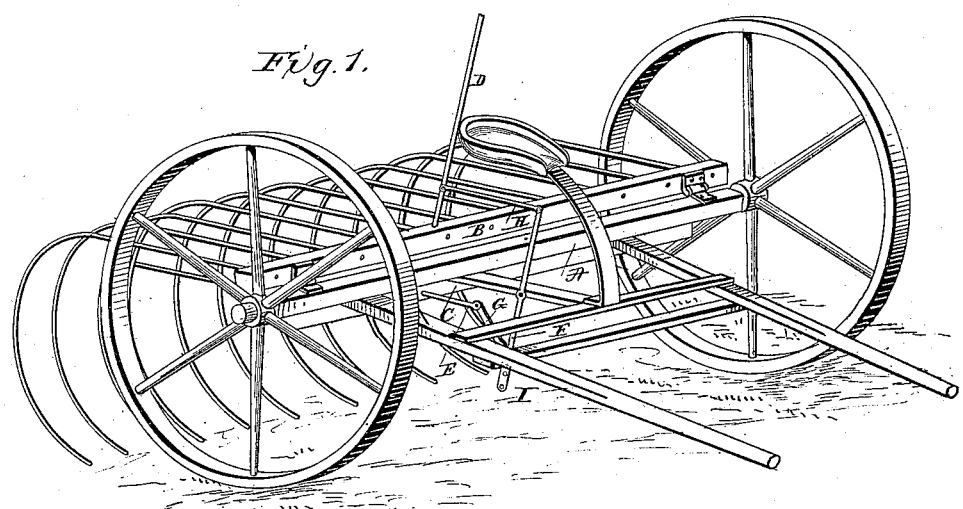
Figure 2:
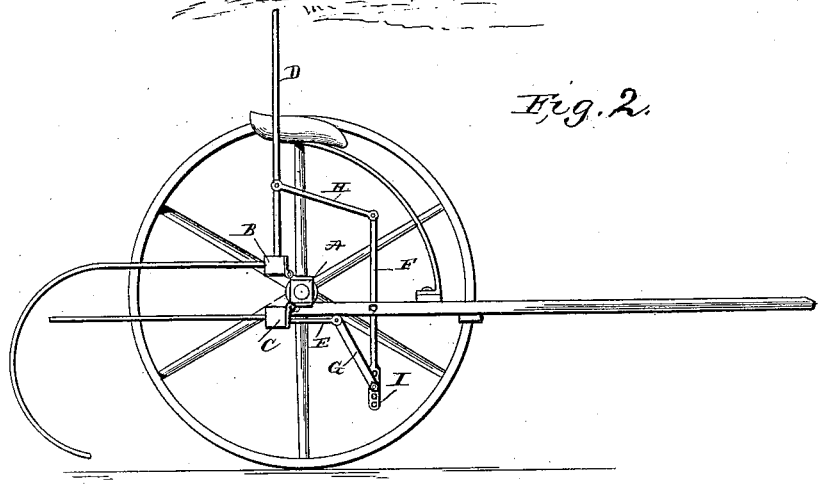
Figure 3:
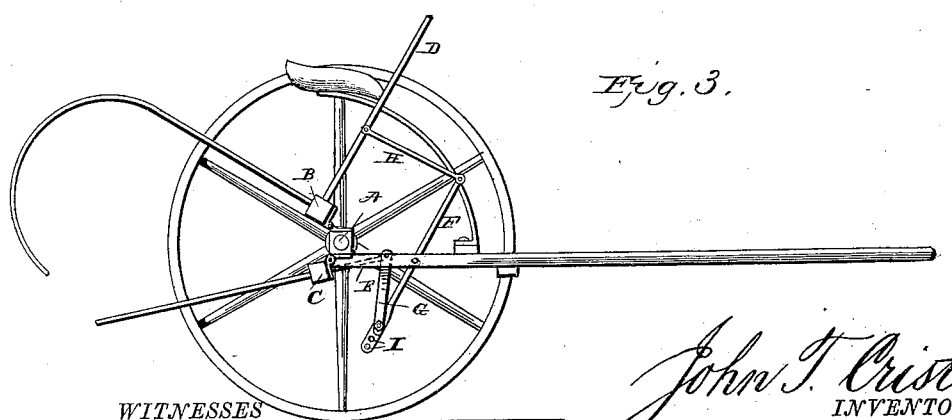

Figure 1 is a perspective view of my improved rake. Fig. 2 is an end view of the same in position for raking, one wheel being removed, and Fig. 3 is a similar view of the same in the dumping position.

Like letters of reference indicate like parts in the three figures.

My invention has relation to horse-rakes; and it consists in the improved construction, arrangement, and combination of parts, as will be hereinafter fully described and claimed.

In the drawings, A represents the axle of a sulky-rake, which is provided with ordinary wheels, thills, cross-bars, and seat; B, the rake-head with its teeth, which is hinged at its ends to the upper side of the axle; C, the clearer-head with its clearers, which is hinged at its ends to the under side of the axle; and D, the dumping-lever, which is connected to the rake-head directly and to the clearer-head by means of a series of links and levers. Of this series a lever, E, is rigidly attached to the clearer-head; another lever, F, is pivotally attached to the thill-frame; a link, G, is connected at one end with the lever E and at the other end it is adjustably connected to the lower end of lever F, which is provided with holes I for said adjustment, and another link, H, connects the upper end of lever F to the dumping-lever.

By pushing the dumping lever forward the rake-head and clearer-head are rotated simultaneously in opposite directions, causing the clearers to descend while the rake-teeth ascend, thus dumping the load.

In my improved rake the teeth do not have to be raised as high to dump their load as do the teeth of those rakes which have stationary clearers. The clearers being able to pass beyond the ends of the teeth, the latter are quickly and completely freed of their load. The time taken in dumping the load is shortened, thus providing against dragging and scattering the same. The teeth are ready to begin raking immediately upon passing the windrow, and the stroke of the dumping-lever is shortened.

Having thus fully described my invention, I claim and desire to secure by Letters Patent of the United States—

A sulky-rake having both rake-head and clearer-head hinged to the axle, a dumping-lever attached to the rake-head, a lever pivoted to the thill-frame, a link connected to the upper end of the latter lever and to the dumping-lever, a lever attached to the clearer-head, and a link attached by one end to the latter lever and by the other attached adjustably to the lower end of the lever pivoted to the thill-frame, substantially as described and set forth.

In testimony that I claim the foregoing as my own I have hereunto affixed my signature in presence of two witnesses.

J. T. CRIST.

Witnesses:
M. T. HOWELL,
J. S. TOMB.